United States Patent

[11] 3,604,476

| [72] | Inventor | John W. Black |
| | | Prairieville Township, Barry County, Mich. |
| [21] | Appl. No. | 873,209 |
| [22] | Filed | Nov. 3, 1969 |
| [45] | Patented | Sept. 14, 1971 |
| [73] | Assignee | Pemco Wheel Company |
| | | Kalamazoo, Mich. |

[54] HOOK APPLYING MACHINE
6 Claims, 7 Drawing Figs.

| [52] | U.S. Cl. | 140/112, 140/80 |
| [51] | Int. Cl. | B21f 15/08, B21f 27/14 |
| [50] | Field of Search | 140/1, 80, 81.5, 112 |

[56] References Cited
UNITED STATES PATENTS

| 3,045,715 | 7/1962 | Monahan et al. | 140/112 |
| 3,200,857 | 8/1965 | Miller | 140/112 |

*Primary Examiner*—Lowell A. Larson
*Attorney*—Woodhams, Blanchard & Flynn

ABSTRACT: A pair of elongated, spaced wires are simultaneously advanced into positions where the free ends of the wires are disposed respectively between two pairs of welding electrodes. Both wires are severed at points spaced from the free ends thereof and the wires are bent to form hooks. An object, such as one edge of a wire rack, is also positioned between the pairs of welding electrodes, after which the electrodes are driven into engagement with the object and the free ends of the wire hooks to weld them to the object.

INVENTOR.
JOHN W. BLACK
BY
Woodhams, Blanchard & Flynn
ATTORNEYS

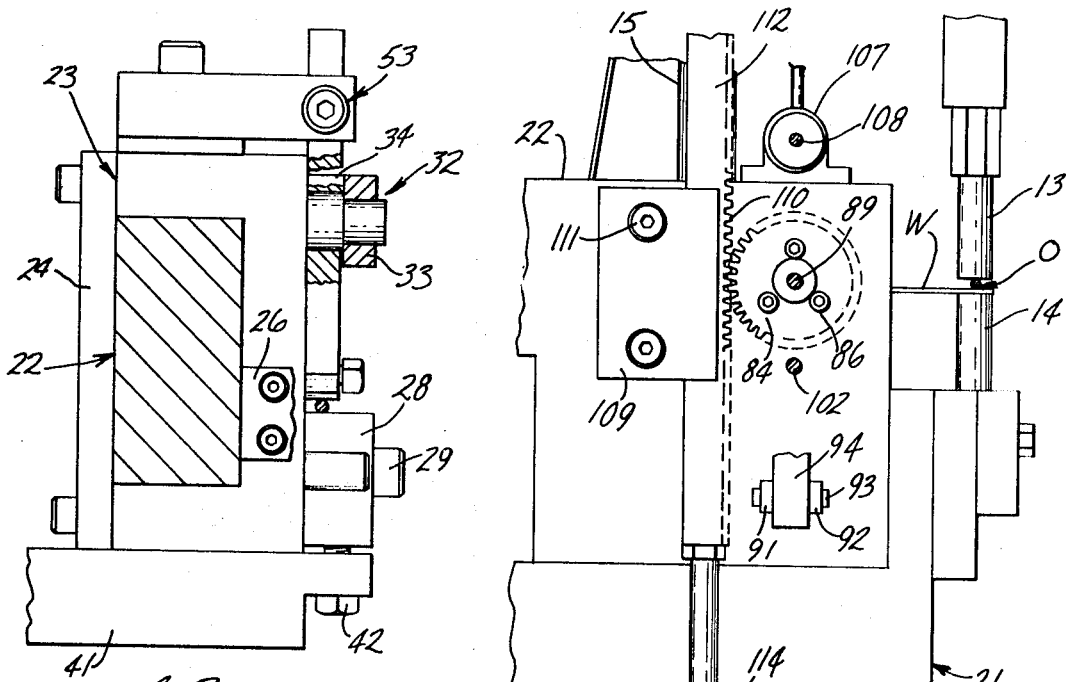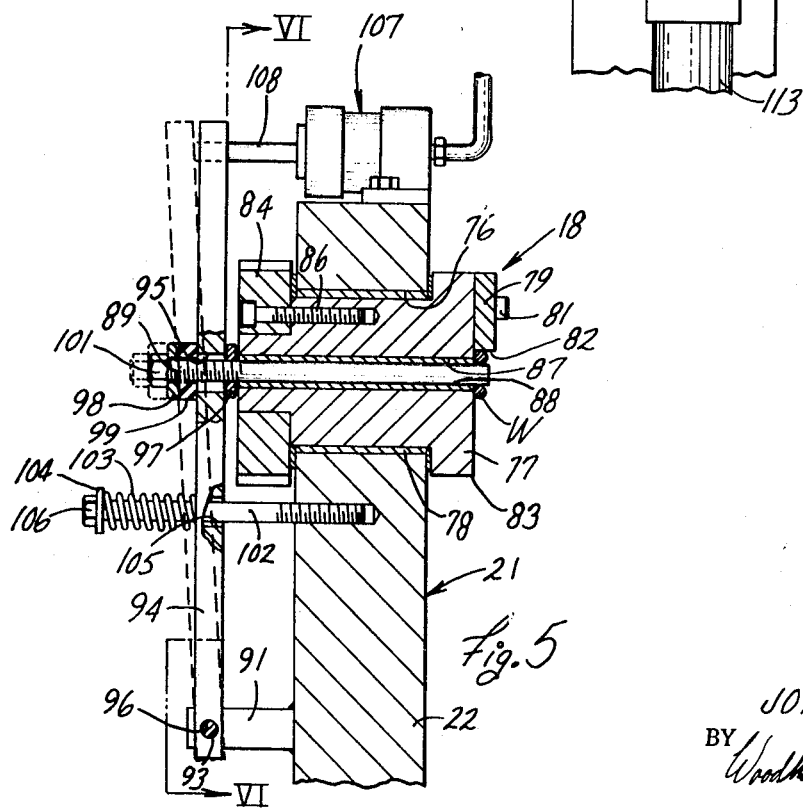

INVENTOR.
JOHN W. BLACK

HOOK APPLYING MACHINE

FIELD OF THE INVENTION

This invention relates to a method and machine for automatically forming hooks from wire and welding said hooks to an object and, more especially, to a machine and method which perform the forming and welding operations substantially simultaneously.

BACKGROUND OF THE INVENTION

There are many industrial operation in which a plurality of objects are moved by a conveyor through one or more zones of treatment such as degreasing, painting, heat treating, plastic coating and the like. It is convenient to support the objects by hooks which may be welded to or loosely engage the object. In many instances, the hooks must be welded or similarly fastened to the object because it has no openings or projections which can be loosely and removably engaged by one end of a double hook.

Known devices for welding a hook to an object have been independent of the hook-forming device and accordingly, have involved a two-step operation. That is, the hook was formed and thereafter transferred to a welding machine or station where the stem of the hook was attached to an object by the welding electrodes. The process of moving the newly formed hook into alignment with the welding electrodes involved additional time and machinery which often increased the cost of the operation beyond the bounds of acceptable cost limitations.

In order to avoid this problem, separable double hooks were used because they avoided the welding operation and they could be reused. However, conventional double hooks often produce highly undesirable results in certain types of operations. For example, it may be at least difficult, if not impossible, to attach the double hook securely to the object. A double hook doubles the chance of an accidental disconnection; and loosely engaged hooks often cover so much of the object that they leave a substantial and unacceptable area which remains untreated.

Accordingly, it is a primary object of this invention to provide a machine and method for forming a hook and welding the hook to an object at about the same time whereby the cost and time for making and attaching the hook are appreciably reduced, and whereby the need for a double hook or a hook loosely attached to the object is eliminated.

It is a further object of this invention to provide a machine having a plurality of devices for substantially simultaneously forming hooks and welding them to an object so that a plurality of hooks will become securely fastened to an object to permit the object to be supported by said plurality of hooks for any desired purpose, such as the application of a plastic coating as disclosed in my copending application Ser. No. 625,123, filed Mar. 22, 1967.

SUMMARY OF THE INVENTION

The objects and purposes of the invention are met by providing a method and machine for forming at least one hook and welding it to an object, said machine having a pair of welding electrodes and means for advancing wire into a position where the free end of the wire and part of an object are located adjacent each other between the electrodes. Wire-severing and bending means cut the wire at a point spaced from the electrodes and simultaneously forms a hook from the severed portion of the wire. Simultaneously with the hook forming, the electrodes are moved together to engage the object and the free end of the severed portion of wire so that the hook is formed at the same time it is welded to the object.

Other objects and purposes of this invention will be apparent to persons acquainted with apparatus of this general type upon reading the following specification and inspecting the accompanying drawings, in which:

FIG. 3 is an enlarged and partially broken, sectional view taken along the line III—III in FIG. 2;

FIG. 5 is a sectional view taken along the line V—V in FIG. 4;

FIG. 6 is a sectional view taken along the line VI—VI in FIG. 5; and

Certain terminology will be used in the following descriptive material for convenience in reference, only. The words "front" and "rear" will refer to the left and right, respectively, as appearing in FIG. 2. The words "up" and "down" will have reference to the machine as appearing in FIGS. 2 and 4. The words "in" and "out" will refer, respectively, to the geometric center of the device and parts thereof. Such terminology will include derivatives and words of similar import.

DETAILED DESCRIPTION

Figure 1:
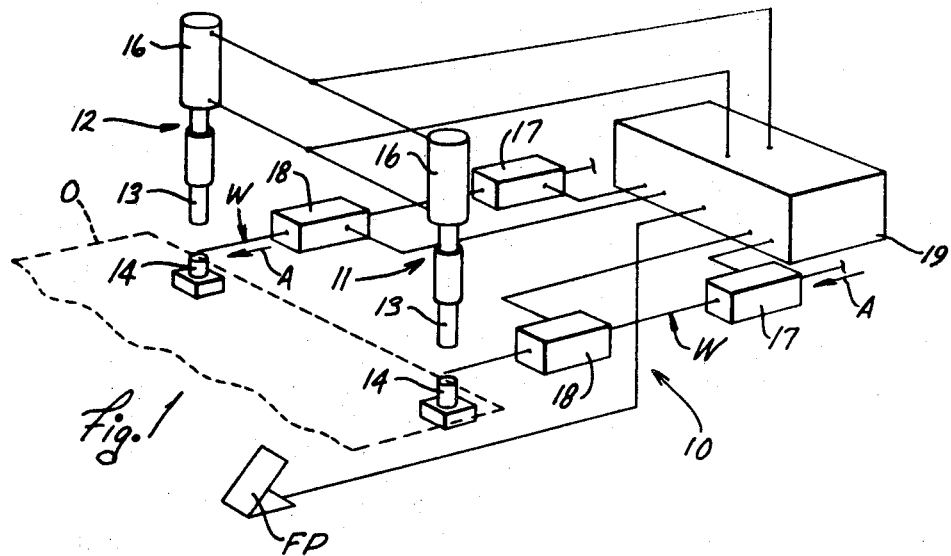
FIG. 1 is a schematic perspective view illustrating a machine embodying the invention and having mechanism for cutting, forming and welding a pair of wires.

FIG. 1 illustrates schematically the machine 10 for forming hooks and welding same to an object 0. The machine 10 (FIG. 1) comprises, in this particular embodiment, a pair of welding devices 11 and 12, each device having a pair of welding electrodes 13 and 14 and a power cylinder 16 for driving the electrode 13 toward and away from the electrode 14. The welding devices 11 and 12 may be mounted on any convenient support structure, part of which is illustrated at 15 in FIG. 2.

In general, a wire W (FIG. 1) is advanced frontwardly toward the welding electrodes 13 and 14, as indicated by the arrow A, by a wire-advancing device 17. The wire W is also moved through a wirecutting and hook-forming device 18 as the free end of the wire W approaches a position between the welding electrodes 13 and 14.

Figure 7:
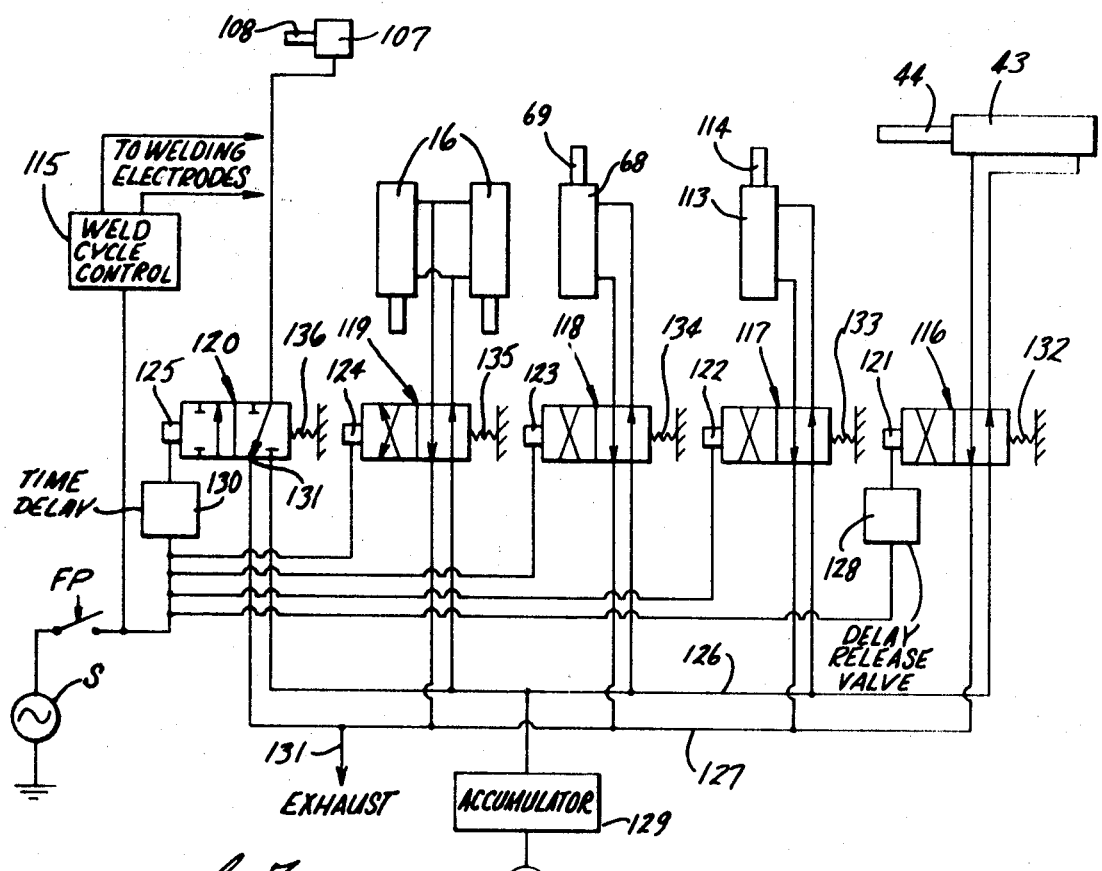
FIG. 7 is a schematic illustration of a pneumatic circuit for effecting the operation of said machine.

A foot pedal FP (FIG. 1) is provided for actuating a control 19 which energizes the wire-advancing device 17, the device 18 for cutting and forming the hook as well as welding circuitry, partially disclosed in FIG. 7. The control 19 also synchronizes the wire-advancing operation, the wirecutting operation and the hook-forming operation.

The following description provides a more detailed discussion of the various components mentioned above.

Wire-Advancing Device 17

The wire-advancing device 17 (FIG. 2) is mounted on the frame 21 of the machine 10 which includes an elongated, horizontally extending and elevated rail 22. A carriage 23 is slidably mounted on the rail 22 for sliding movement between forward and rearward positions, the rearward position being illustrated in FIG. 2 and the forward position being illustrated in FIG. 4. The carriage 23 has a sidewardly opening U-shape (FIG. 3) and it may be held upon the rail 22 by any convenient means, such as by a plate 24 secured to the upper and lower legs of the carriage 23 is slidably engaged with said rail.

Figure 4:
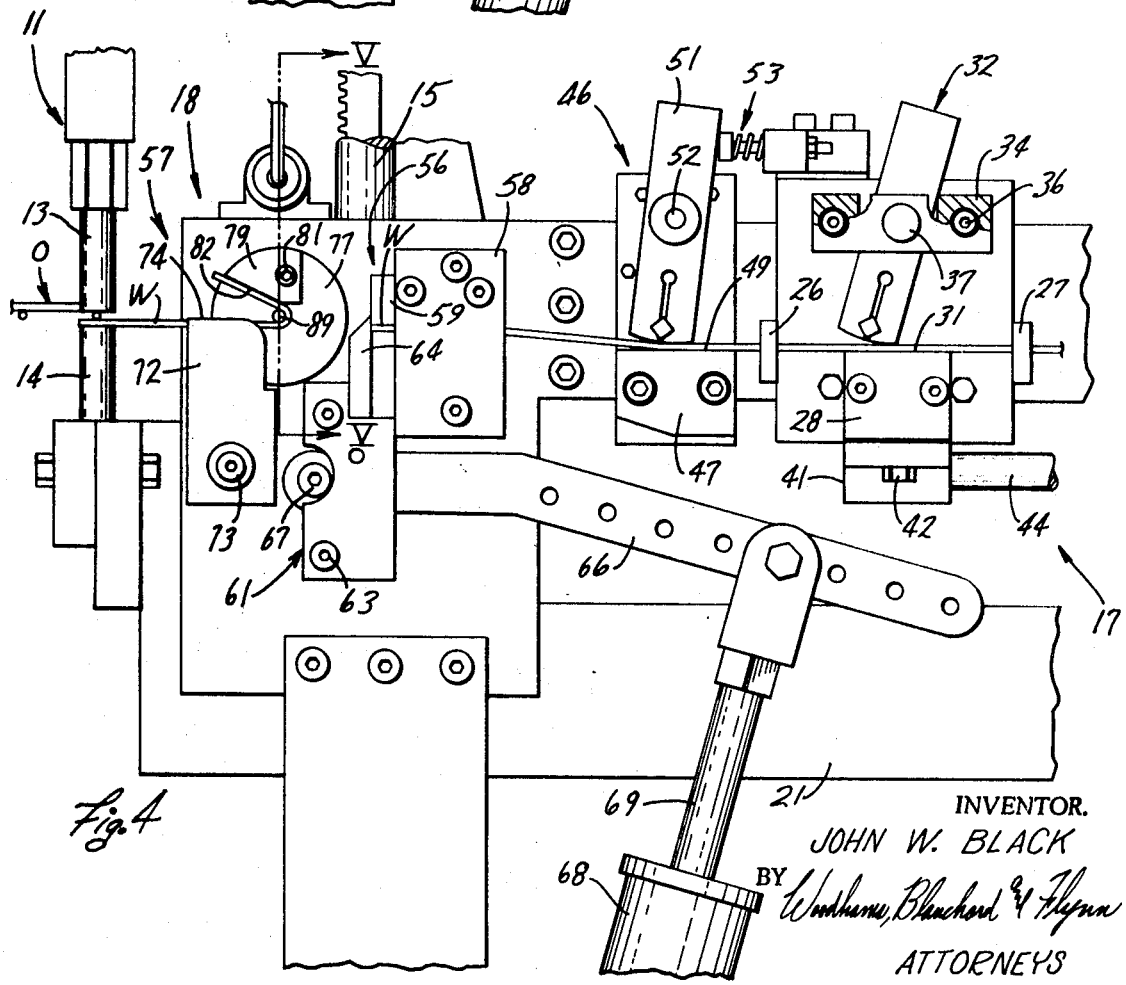
FIG. 4 is an enlarged fragment of FIG. 2 after the severed portion of the wire has been formed into a hook.

A pair of wire guides 26 and 27 (FIG. 2) are secured to the front and rear ends, respectively, of the carriage 23 and each has an opening therethrough for loosely receiving the wire W. A block 28 is secured to the side of the carriage 23 by a pair of screws 29 and is oriented so that the upper surface 31 thereof is aligned with the openings in the guides 26 and 27 whereby said surface is engaged by the wire W between the wire guides 26 and 27. The block 28 acts as the lower part of a wire clamp 32 having an upper part 38. A U-shaped bracket 33 has a pair of legs 34 secured to and projecting outwardly from the carriage 23 (FIG. 4). The legs 34 have openings for receiving screws 36 which secure the bracket 33 to the carriage 23. A pin 37 is secured to the bracket 33 and extends toward the carriage 23 to pivotally support the elongated upper part or lever 38. The length of the portion of the part 38 below the pin 37 is preferably equal to or slightly less than the distance between the pin 37 and the upper surface 31 of the block 28. Since the wire W is located on the upper surface 31 of the block 28, the lever will not be able to assume a complete vertical orientation and will be maintained slightly inclined to the vertical. Thus, counterclockwise urging of the lever 38 about the pin 37 will pinch and securely clamp the wire W between the lower end of the lever 38 and the upper surface 31 of the block 28. On the other hand, a clockwise movement of the lever 38 will cause the wire-clamping device 32 to release the wire W and permit movement of the wire W relative to the carriage 23.

Figure 2:
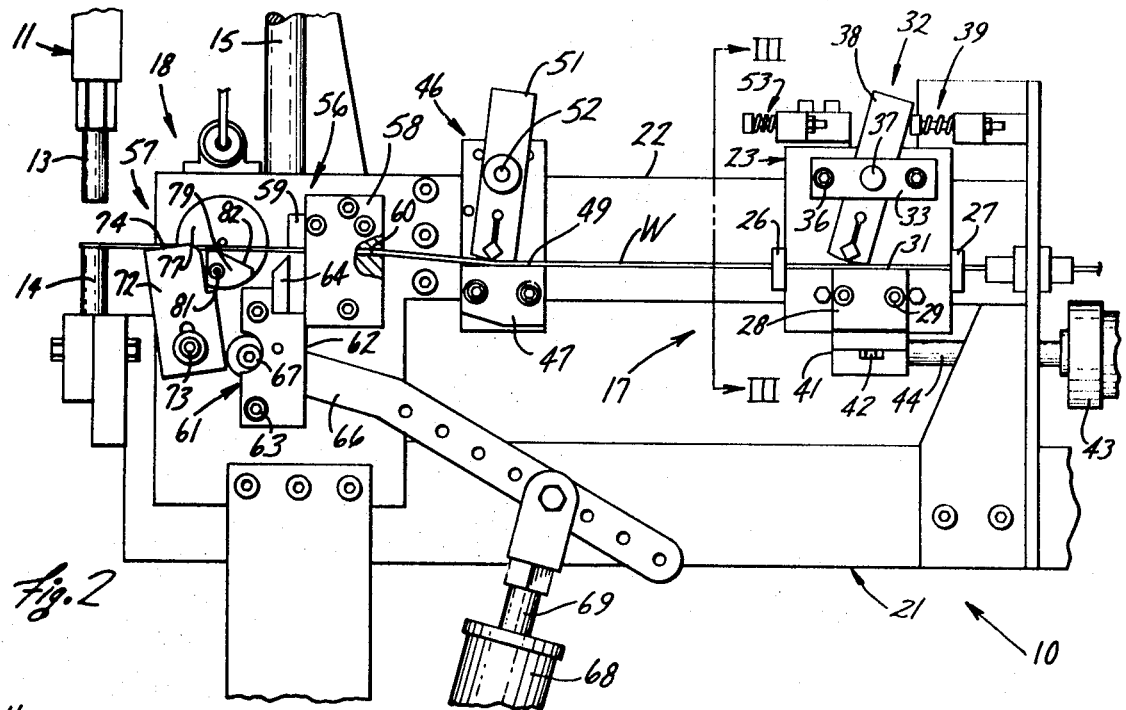
FIG. 2 is a fragmentary, side-elevational view of the wire-advancing, cutting, forming and welding mechanisms of said machine.

In this particular embodiment, a horizontal, spring-biased plunger 39 is slidably mounted on the rear end (FIG. 2) of the frame 21 above the rail 22 and is positioned to engage the rear surface at the upper end of the lever 38 as the carriage 23 approaches the rearward end of its movement illustrated in FIG. 2. The spring-loaded plunger 39 will urge the lever 38 to move in a counterclockwise direction and thereby clamp the wire W Between the lower end of the lever 38 and the upper surface 31 of the block 28.

The carriage 23 (FIG. 2) is moved lengthwise of the rail 22 by a power cylinder 43 mounted upon the frame 21. Specifically, the cylinder 43 has a piston rod 44 connected to a bracket 41 which is secured to the underside of the carriage 23 by the screw 42.

A spring-loaded plunger 53 is slidably mounted upon the upper forward end of the carriage 23 and extends forwardly therefrom.

The wire-advancing device 17 also includes a wire gripper 46 (FIG. 2) secured to the rail 22 at the forward end of the movement of the carriage 23. Said gripper includes a wire support block 47 having an upper surface 49 thereof horizontally aligned with the upper surface 31 of the block 28. A wire-clamping lever 51 is pivotally supported above the block 47 by a pin 52. The length of the lower portion of the lever 51 is preferably equal to or slightly less than the distance between the pin 52 and the upper surface 49 of the wire support block 47. Thus, counterclockwise urging of the lever 51 about the pivot pin 52 will cause the lower end of the lever 51 to wedge the wire W against the upper surface 49 of the wire support block 47. A movement of the lever 51 in a clockwise direction will disengage the lower end thereof from the wire W and permit a relative movement of the wire W relative to the wire gripper 46.

Wirecutting and Hook-Forming Device 18

The wirecutting and hook-forming device 18 (FIGS. 2, 4 and 5) comprises two sections, namely a wirecutting section 56 (FIG. 2) and a hook-forming section 57. The wirecutting section 56 has a wire guide 58 secured to the rail 22 forwardly of the wire gripper 46. The wire guide 58 has an opening 60 therethrough for guiding the wire W, and a shear block 59 is secured to the forward side thereof adjacent the upper edge of the front end of said opening 60.

A shear 61 comprises a blade guide 62 secured to the frame 21 adjacent the forward end of the rail 22 by a plurality of screws 63. A blade 64 is mounted in the guide 62 for vertical movement across the path of the wire W adjacent to and slightly frontwardly of the shear block 59. The front end of a lever 66 is pivotally mounted at 67 on the frame 21 and engages the blade 64 rearwardly of the pivot 67 for urging said blade across said path of the wire W.

A power cylinder 68 (FIG. 2) is mounted at its lower end (not shown) on the frame 21 and has a piston rod 69 pivotally secured at its upper end to the lever 66 rearwardly of the blade 64.

The hook-forming section 57 comprises a wire guide 72 pivotally mounted at 73 on the frame 21 adjacent the forward end of the rail 22 and forwardly of the shear 61. The upper surface 74 of the wire guide 72 is positioned below and adjacent the path of the wire W as said wire moves from the shear 61 to the welding device 11.

A horizontal opening 76 is provided through the rail 22 (FIG. 5) adjacent the front end thereof and a bushing 78 is disposed in said opening. A flanged cylinder 77 is rotatably supported in the bushing 78, and a bending block 79 is secured to flanged right end 83 (FIG. 5) of the cylinder 77 by a screw 81. The block 79 has a wire-engaging surface 82 (FIG. 2) which is spaced from and faces the rotational axis of the cylinder 77. When said cylinder is in its normal position of rest, before a forming operation is initiated, the block 79 is below and adjacent the path of the wire W between the shear 56 and the welding device 11. Also, the surface 82 slopes downwardly and rearwardly to guide the leading end of the wire W onto the upper surface 74 of the wire guide 72.

A gear 84 (FIGS. 5 and 6) is secured to the left end of cylinder 77 by a plurality of screws 86. A coaxial opening 87 is provided through the cylinder 77 and houses a sleeve 88. A rod 89 is slidably disposed in the sleeve 88 and is of such length that it extends beyond both ends of the cylinder 77 and sleeve 88 as illustrated in solid lines in FIG. 5. In this position, the right end of said rod 89 extends over the path of the wire W.

A pair of spaced brackets 91 and 92 (FIG. 6) are secured to the left side (FIG. 5) of the frame 21 adjacent the front end of the rail 22 and a pin 93 extends therebetween. A lever 94 has an opening 96 adjacent the lower end thereof through which the pin 93 extends to pivotally support the lever. In this particular embodiment, the lever 94 has a transverse opening 95 in the central part thereof through which the rod 89 loosely extends. A nut 97 on the rod 89 between the lever 94 and the leftward side of the cylinder 77 limits the rightward extension of the rod 89 beyond the sleeve 88 and the cylinder 77. A nut 98 holds a resilient pad 99 against the left side of the lever 94 to facilitate the pivoting movement of the lever 94 about the axis of the pin 93 to effect axial movement of the rod 89. A lock nut 101 holds the nut 98 in place.

A bolt 102 (FIG. 5) is secured to the left side of the rail 22 and extends through an opening 105 in the lever 94. A spring 103 is sleeved upon the bolt 102 between the lever 94 and a washer 104 located adjacent the head 106 of the bolt 102 to resiliently bias the lever 94 into the position illustrated in solid lines in FIG. 5.

A power cylinder 107 (FIG. 5) is mounted on top of the rail 22 and the piston rod 108 thereof is engaged with the upper end of the lever 94 to urge it away from the rail 22.

A rack guide 109 (FIG. 6) is secured to the rail 22 by a pair of screws 111 near the forward end thereof, but rearwardly of the gear 84. A rack 112, which has teeth 110 engaged with the teeth on the gear 84, is guided for vertical, lengthwise movement by the guide 109. A power cylinder 113 is fixedly secured to the frame and the rod 114 thereof is secured to the lower end of the rack 112 to effect vertical movement thereof.

Control 19

FIG. 7 illustrates schematically one type of control circuit for synchronously controlling the movement of the power cylinders 16, 43, 68, 107 and 113 as well as a weld cycle control 115. The weld cycle control 115 may be of any conventional variety which controls the timing of the weld and the sequencing and timing of the various machine operations required to make the weld.

The circuit of FIG. 7 is shown to be energized electrically. It is recognized, however, that the valves may be energized pneumatically and it is to be considered within the scope of this invention to include both types of valve energization.

In the circuitry of FIG. 7, a source S of electrical energy is connected to one side of a foot-operated switch FP. The other side of the switch FP is connected to a plurality of of two-position valves 116, 117, 118, 119 and 120 illustrated by conventional JIC (Joint Industry Conference) symbols for two-position valves. The other side of the switch FP is also connected to the weld cycle control 115. The valves 116 to 120 are energizable by solenoids 121 to 125, respectively, so that upon closing of the switch FP, each one of the valves 116 to 120 will be shifted immediately rightwardly by the solenoids 121 to 125, respectively. Thus, the left box of each of said valves will be positioned in alignment with the pressure and exhaust conduits 126 and 127, respectively. The two-position valves 116 to 120 are biased in the positions illustrated in FIG. 7 by springs schematically illustrated at 132–136.

A delay release valve 128 is provided in the line between the switch FP and the solenoid 121 of the valve 116. A time delay valve 130 is provided in the line between the switch FP and the solenoid 125. The pressure line 126 is supplied by a pump P in series with an accumulator 129. The exhaust line 127 is connected to an exhaust port 131 in valve 120.

OPERATION

Although the operation of the apparatus of the invention will be apparent to skilled persons from the foregoing description, a summary of such description is now given for convenience.

At the beginning of each cycle for simultaneously forming and welding a hook to an object, the free ends of the wire W are located between the welding electrodes 13 and 14 of each of the welding devices 11 and 12, as is illustrated in FIGS. 1 and 2. When the operator is ready to weld the free ends of the wires W to an object 0, the object is first inserted between the electrodes 13 and 14 so that it rests upon the free ends of the wires W. The operator when closes the switch FP resulting in the simultaneous energization of the solenoids 121 to 124 of the valves 116 to 119, respectively. Since all of the valves, except valve 120, are energized simultaneously, the operation of each valve will be now discussed separately for convenience.

Valve 116

Energization of the solenoid 121 (FIG. 7) will shift the two-position valve 116 so that pressure is applied to the power cylinder 43 to retract the rod 44, whereby the carriage 23 (FIG. 2) will be moved from the position illustrated in FIG. 4 to the position illustrated in FIG. 2. The wire gripper 46 will prevent a rearward movement of the wire W so that the free end thereof will remain between the electrodes 13 and 14.

Valve 118

Energization of the solenoid 123 of the valve 118 (FIG. 7) results in the application of pressure to the power cylinder 68 (FIG. 2) to extend the rod 69 from its position of FIG. 2 to its position of FIG. 4 whereby the cutter blade 64 is moved upwardly to sever the wire W as illustrated in FIG. 4.

Valve 117

Energization of the solenoid 122 of the valve 117 results in the application of pressure to the power cylinder 113 (FIG. 6) to extend the rod 114 and thereby move the rack 112 upwardly to rotate the cylinder 77 (FIG. 2) in a counterclockwise direction. This rotation causes the block 79 (FIG. 2) to move from the position illustrated in FIG. 2 to the position illustrated in FIG. 4. The rear end of the severed portion of the wire W is engaged by the surface 82 on the block 79 and is bent around the right end of the rod 89 into the form of a hook.

Valve 120

Energization of the solenoid 125 (FIG. 7) is delayed by the time delay mechanism 130 for a short time interval, after which the valve 120 is shifted and pressure is applied to the cylinder 107 to extend the rod 108 thereof. Extension of the rod 108 results in a pivotal movement of the lever 94 (FIG. 5) from the solid line position to the broken line position to retract the rod 89 so that the right end thereof is within the central portion of the cylinder 77 and out of engagement with the wire W. The time delay is necessary to permit completion of the hook before the pin is retracted.

The weld cycle control 115 is energized by a closing of the switch FP. As a result, the valve 119 is shifted to supply power to the power cylinders 16 to drive the electrodes 13 toward the electrodes 14. After a time delay (squeeze time) determined by the control 115, the weld current is turned on for a predetermined time (weld time). The electrodes maintain pressure on the work without welding current for a third time interval (hold time) to permit the weld nugget to solidify. At the end of this hold time, the valve 119 is deenergized and the electrodes 13 and 14 are separated.

In summary, while the weld is being made between the wires and the object 0, the wire W is severed by the wirecutting section 56 and thereafter bent into the form of a hook by the hook-forming section 57.

At the completion of a hook-forming and welding cycle, the switch FP will open to deenergize the solenoids 117 to 120 to cause the power cylinders 16, 68, 107 and 113 to return to their initial positions. The solenoid 121 will remain energized by the delay release valve 128 to give the operator sufficient time to remove the object and the hooks welded thereto from the welding machine. A predetermined time interval later, the delay release valve 128 will permit a deenergization of the solenoid 121 to shift the valve 116 to supply power to the power cylinder 43 to extend the rod 44 thereof. An extension of the rod 44 will move the carriage 23 from the position illustrated in FIG. 2 to the position illustrated in FIG. 4. The wire clamp 32 will grip the wire between the lower end of the lever 38 and the upper surface 31 of the block 28 to prevent relative movement between the wire W and the carriage 23. As a result, the carriage 23 will push the wire frontwardly through the wire gripper 46, the wire guide 58, and the wire guide 72 to a position where the free end is located between the welding electrodes 13 and 14. Thus, the device 10 is returned to a condition for repeating the foregoing welding and hook-forming cycle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for forming hooks from an elongated wire element and welding said hooks to an object, comprising:
    a pair of spaced-apart welding electrodes, one of said electrodes being movable toward and away from the other electrode;
    first drive means for moving said one electrode;
    wire-advancing means for moving said wire element intermittently lengthwise thereof along a line passing between said electrodes, such movement being terminated when the free end of the wire becomes aligned between said electrodes;
    wire-severing means disposed between and spaced from said pair of electrodes and said wire-advancing means;
    second drive means for actuating said wire-severing means;
    wire-bending means disposed between and spaced from said pair of electrodes and said wire-severing means for forming a hook from the end portion of the severed part of wire spaced from said pair of electrodes;
    third drive means for operating said bending means; and
    means synchronizing said first, second and third drive means whereby said object is welded to said free end of said wire while said wire is cut by said wire-severing means and said hook is formed by said bending means.

2. An apparatus according to claim 1, including frame means having rail means extending along said line away from said electrodes;

wherein said wire-advancing means comprises fixed clamp means attached to said rail means adjacent said wire-severing means on the opposite side from said electrodes and having first wire-gripping means releasably engageable with said wire along said line for positively opposing movement of said wire away from said wire-severing means and toward said fixed clamp means;

movable clamp means slideably supported upon said rail means for movement toward and away from said fixed clamp means on the opposite side thereof from said severing means, said movable clamp means having second wire-gripping means releasably engageable with said wire along said line, said second gripping means positively preventing movement of said wire relative to said second clamp means in a direction toward said movable clamp means and away from said fixed clamp means, whereby movement of said movable clamp means toward said fixed clamp means advances wire through said fixed clamp means, and movement of said movable clamp means away from said fixed clamp means effects relative movement between said wire and said movable clamp means.

3. An apparatus according to claim 1, including rail means extending along said line away from said electrodes;

wherein said wire-severing means comprises a shear block mounted upon said rail means;

a guide adjacent said shear block for guiding said wire along said line;

blade means reciprocably supported adjacent said shear block and cooperable therewith for cutting said wire;

lever means engaged with said blade for effecting said reciprocable movement and wherein said second drive means is a power cylinder connected to said lever means.

4. An apparatus according to claim 1, including rail means extending along said line away from said electrodes;

wherein said wire-bending means comprises circular means rotatably supported on said rail means for movement around an axis adjacent said line of said wire and transverse thereof;

first block means mounted on said rail means and having a first surface adjacent and substantially parallel with said wire line;

rod means coaxial with said circular member and extendable therefrom into a position above and adjacent said wire line;

second block means mounted upon said circular means and having a second surface thereon movable with said circular means into a position opposed to, spaced from and at an acute angle with said first surface, whereby the portion of said wire severed by said severing means is bent around said rod means into a hook;

means for retracting said rod means from said position.

5. An apparatus according to claim 1, wherein said first, second and third drive means are pressure fluid-actuated cylinders and said synchronizing means includes solenoid valves connected between a source of pressure fluid and said power cylinders for sequencing the operation thereof.

6. A method for forming plural hooks and attaching them simultaneously to an object whereby said object can be supported, comprising the steps of:

supporting said object in position between two spaced pairs of welding electrodes, one electrode of each pair being movable toward and away from the other;

locating portions of a pair of elongated wire elements along a pair of substantially straight, parallel and spaced paths, each path passing between one of said pairs of electrodes;

intermittently advancing said wire elements along said paths;

severing a part of each wire element from the remainder thereof near said electrodes between advancements of said wire elements and immediately thereafter bending said severed parts to form hooks; an simultaneously with said severing and bending, causing said electrodes to hold said severed parts of said wire elements against said objects and welding them together.